United States Patent Office 3,232,315
Patented Feb. 1, 1966

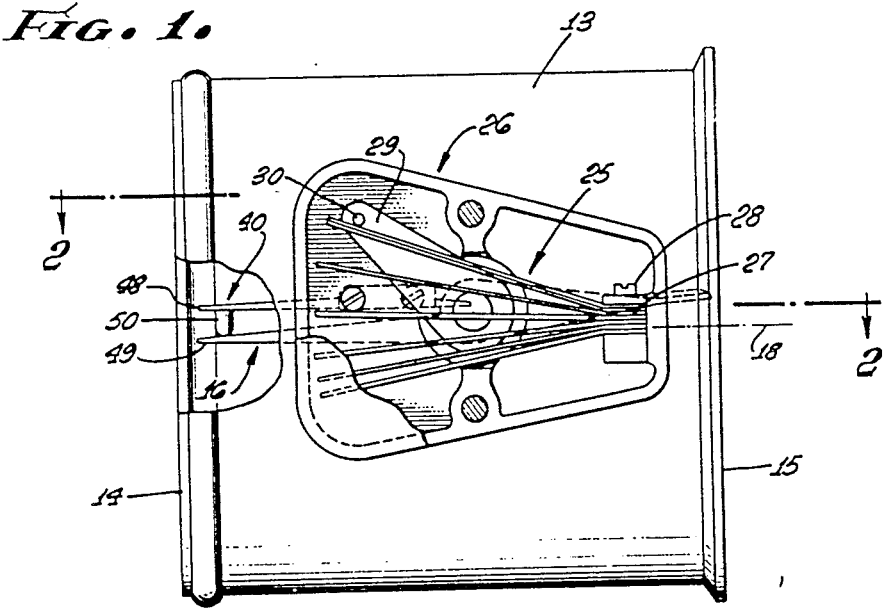

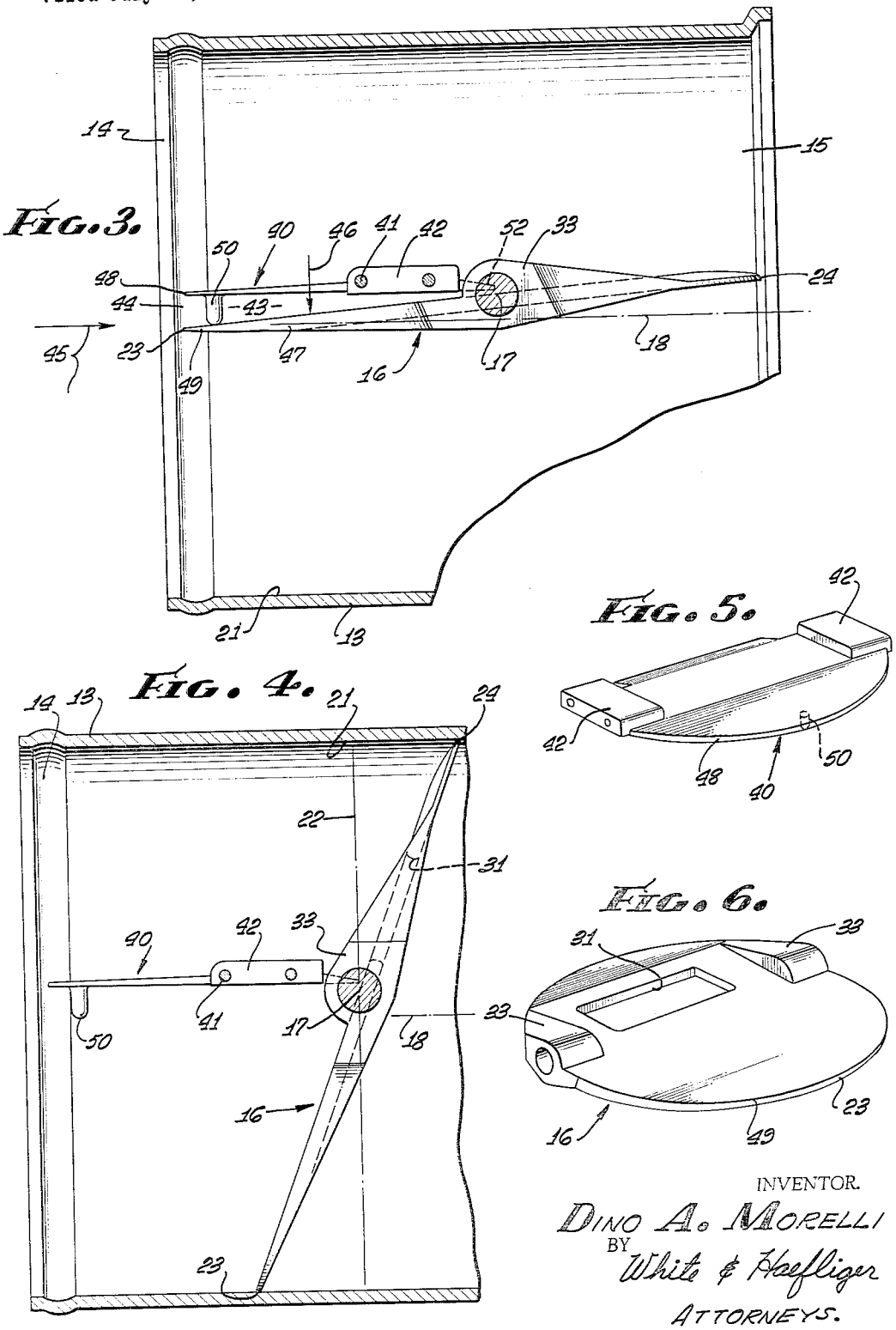

3,232,315
LOW FLOW RATE RESPONSIVE DAMPER VALVE
Dino A. Morelli, Pasadena, Calif., assignor to Task Corporation, Anaheim, Calif., a corporation of California
Filed July 22, 1963, Ser. No. 296,835
9 Claims. (Cl. 137—521)

This invention relates generally to apparatus for controlling gas flow between upstream and downstream zones at higher and lower pressures respectively. More specifically, it concerns improvements in a flow control assembly including a damper characterized as functioning to decrease the flow area of a main orifice formed in a principal conduit in response to increasing differential pressure of gas upstream and downstream of the damper. Such structures are typically usable to maintain substantially constant the mass flow of air between upstream and downstream zones.

In the maintenance of aircraft cabin pressurization it is desirable to maintain a condition of substantially constant mass flow of air into and out of the cabin pressurization zone for proper ventilation. This condition must be maintained for all design flight altitudes, requiring the use of a device for controlling the escape of air from the constant pressure cabin to the exterior where the air pressure drops with increasing altitude. Flow control devices constructed to maintain a generally constant mass discharge flow of air have incorporated butterfly-type valves or dampers which move to decrease the flow of air in a discharge conduit in response to increasing tendency of the air in the upstream zone to escape to the exterior, due to lowering of exterior air pressure with altitude. However, such devices become less sensitive in their action when the flow rate diminishes to relatively low values, one reason for this being that small changes in dynamic pressure conditions at the valve under reduced flow do not reflect themselves in sufficient valve movement against imposed resistance. This undesirable characteristic becomes critical in certain other applications as well as that mentioned above, and where locally reduced flow conditions are frequently encountered.

The present invention contemplates a solution to the above problems through the provision of novel means for establishing a locally reduced flow, dynamic pressure condition acting to aid valve movement against imposed resistance. As broadly considered, the invention incorporates in apparatus for controlling gas flow an assembly including a flow conduit and a valve movable therein against imposed resistance, the assembly forming a recess for establishing a locally reduced flow dynamic pressure condition acting to aid valve movement against such resistance. More specifically, the valve may be mounted to pivot in the flow conduit to decrease the flow area therein in response to increasing differential pressure of gas upstream and downstream of the damper, the assembly including yieldable means for increasingly resisting damper pivotal movement toward closed position, and vane means in the conduit forming with the damper a recess located to receive the pressure of the downstream flowing gas for establishing a dynamic head condition acting to aid valve movement against such resistance.

Typically the vane lies in a plane extending generally upstream, and the damper has a transverse pivot axis in the conduit located in such manner that a portion of the damper projects upstream with respect to said axis and at one side of the vane. Furthermore, a stop is provided for limiting the degree of damper pivoting toward open configuration thereby to determine the size of the recess formed between the open damper and vane, all in such manner as to predetermine the dynamic head characteristics established in the recess and acting to aid valve movement against such resistance.

Other features and objects of the invention include the provision of a damper which is peripherally sized to fit the conduit bore in damper closed configuration, with that portion of the damper projecting downstream with respect to the transverse pivot axis containing an auxiliary orifice to pass the flow when the damper is closed. Also, the invention contemplates the provision of novel yieldable spring means located at the immediate exterior of the flow conduit leaving the interior thereof unobstructed excepting for the damper and the vane means cooperating therewith.

These and other objects and advantages of the invention, as well as the details of illustrative embodiments, will be more fully understood from the following detailed description of the drawings, in which:

FIG. 1 is an exterior side elevation, partly broken away to show the over-all configuration of a preferred embodiment of the invention;

FIG. 2 is a section taken on line 2—2 of FIG. 1;

FIG. 3 is a section taken on line 3—3 of FIG. 2 and showing the damper in open configuration;

FIG. 4 is a view like FIG. 3 and showing the damper in closed configuration within the conduit;

FIG. 5 is a perspective showing of a preferred vane;

FIG. 6 is a perspective showing of a preferred damper; and

FIG. 7 is a schematic showing of an aircraft cabin air pressurizing and dumping system.

Referring first to FIG. 7, the aircraft cabin is schematically shown at 10, and pressurizing equipment is shown at 11 for introducing air into the cabin to maintain the interior of the latter at desired pressure. FIG. 7 may also be considered to represent in a larger sense a means for effecting flow of gas to the upstream end of the apparatus 12, such means being operable to vary the gas flow as desired. Also, certain of the gas may be by-passed around the apparatus 12 as indicated by the arrow 100, whereby when the valve in the apparatus 12 is closed, say under supersonic flow conditions, the principal flow is by-passed.

One form of improved apparatus 12 is shown in FIGS. 1 through 6 to comprise an assembly that includes a flow conduit 13 having an upstream entrance end 14, and a downstream exit end 15. Located within the conduit is a valving means, typically in the form of a damper or butterfly valve 16 mounted to rotate about an axis 17 extending transversely of the conduit and eccentrically offset from the conduit axis 18. For this purpose, the valve carries trunnions 19 projecting transversely and within bearing structure 20 carried by the conduit immediately outside the conduit bore or internal periphery 21. Accordingly, the valve is rotatable from an open position as shown in FIG. 3 to a fully closed position as seen in FIG. 4 wherein the valve curved periphery fits the conduit bore to substantially close the latter. At this time, the valve extends generally in a plane which is tilted about the axis 17 with respect to a plane 22 passing through said axis and normal to the conduit axis 18, whereby the terminal edges 23 and 24 of the valve which are forwardmost and rearwardmost respectively are spaced upstream and downstream of the plane 22.

The assembly also includes yieldable means for increasingly resisting damper pivotal movement toward closed position, one such means comprising a series of leaf springs 25 located within a chamber 26 at the outside of the flow conduit. The springs have their terminal ends 27 suitably attached as at 28 to the chamber structure, whereby the springs then project with cantilever relationship generally parallel to the conduit axis 18 so as to be successively flexed in response to rotation of the damper valve. For this purpose, a crank member 29 is carried by one trunnion 19 to have a lug 30 rotatable generally counterclockwise in FIG. 1 as the damper closes, thereby to engage the uppermost flat spring as shown. As the lug continues to rotate with the damper, successive springs are engaged to increase the resistance to damper pivotal movement in the desired manner until all of the springs are stacked in flexed condition when the damper is completely closed.

Recognizing that the principal orifice is formed by the flow conduit and the valve so as to be varied as the valve closes, it will be seen that a fixed orifice is also provided, typically at 31 in the valve plate 32, and generally between thickened portions 33 of the plate which transmit dynamic loading on the valve to the trunnions 19. The flow area of the auxiliary orifice 31 remains substantially independent of movement of the valve as it approaches closed position, whereas the main orifice is rapidly being closed under these conditions. Accordingly, when the damper valve is closed as shown in FIG. 4, the non-by-passed flow escapes through the auxiliary orifice 31. Where the assembly is used in the application shown in FIG. 7, the flow escapes through the auxiliary orifice 31 under supersonic flow conditions so that the mass flow is determined by the upstream pressure only.

As mentioned in the introduction, the assembly also forms a recess for establishing a locally reduced flow, dynamic pressure condition acting to aid valve movement against imposed resistance. Typically, the recess is formed by means acting with the valve so that the recess receives the pressure of the downstream flowing gas, one such means being shown in the form of a vane 40 lying in a plane extending generally upstream. The vane is suitably attached to the flow conduit, as for example by fasteners 41 projecting into thickened portions 42 of the vane. The recess formed between the vane and damper in open position is shown at 43 in FIG. 3, and it will be observed that said recess opens forwardly at 44 to receive the pressure of the downstream flowing gas indicated by the arrows 45. Also, the recess is substantially closed at the rearward terminal 52 of vane 40, extending adjacent the valve 16 and proximate axis 17. Accordingly, under locally reduced flow conditions, the dynamic pressure developed in the recess is exerted in the direction of the arrow 46 against the valve forward portion 47 to aid valve movement against the spring resistance. It is found that valve movement from the position shown in FIG. 3 and toward closed position may be made very sensitive to changes in low velocity flow 45, thereby to greatly extend the useful range of operation of the valve, i.e., from very low flow conditions to very high flow conditions.

It is also seen from the drawings that the forward periphery 48 of the vane is curved in general conformance with the forward periphery 49 of the valve, the latter periphery being shaped generally elliptically to closely fit the bore 21 in the valve plate tilted configuration illustrated in FIG. 4. Accordingly, the recess 43 exists across the transverse extent of the valve forward portion 47, and without the vane materially obstructing or interfering with the flow in any valve position.

Finally, a stop is provided at 50, and typically carried by the vane, to limit the degree of damper pivoting toward open configuration, thereby to establish the desired size of the recess 43.

I claim:
1. In apparatus for controlling gas flow, an assembly including a flow conduit and a damper valve mounted to pivot in the conduit to decrease the flow area therein in response to increasing differential pressure of said gas upstream and downstream of the damper, yieldable means for increasingly resisting damper pivotal movement as the damper pivots away from extreme open position, and vane means projecting upstream in the conduit proximate the damper in fully open position and forming with the damper a recess located to receive the pressure of the downstream flowing gas for establishing a dynamic head condition acting to aid valve movement against said resistance, the vane means having mounting means therefor which blocks vane movement with the damper valve.

2. The invention as defined in claim 1, in which the damper has a transverse pivot axis in the conduit, a portion of the damper projecting upstream with respect to said axis and at one side of said vane means.

3. The invention as defined in claim 2, in which the conduit has a bore and the damper is peripherally sized to fit the conduit bore in damper closed configuration.

4. The invention as defined in claim 2, in which the assembly includes means to limit opening of the damper at a position in which said recess is narrow and tapering generally toward said pivot axis.

5. The invention as defined in claim 1, in which the assembly includes a stop for limiting the degree of damper pivoting toward open configuration.

6. The invention as defined in claim 1, in which said yieldable means includes a series of leaf springs outside the conduit interior and adapted to successively flex in response to damper pivoting toward closed position.

7. In apparatus for controlling gas flow, an assembly including a flow conduit and a damper valve movable therein against imposed resistance, means mounting the damper for said movement and providing said resistance thereto, said assembly forming a recess for establishing a locally reduced flow dynamic pressure condition acting to aid valve movement against said resistance, the assembly including vane means projecting upstream adjacent the recess and proximate the damper valve in fully open position thereof, the damper valve being movable relative to the vane means so that the recess progressively increases in size as the damper valve moves away from fully open position.

8. In apparatus for controlling gas flow, an assembly including a flow conduit and a damper valve movable therein against imposed resistance, means mounting the damper for said movement and providing said resistance thereto, said assembly including means acting with the valve to form a recess to receive the pressure of the downstream flowing gas for establishing a locally reduced flow dynamic pressure condition acting to aid valve movement against said resistance, the assembly including vane means projecting upstream adjacent the recess and proximate the damper valve in fully open position thereof, the damper valve being movable relative to the van means so that the recess progressively increases in size as the damper valve moves away from fully open position.

9. In apparatus for controlling gas flow, an assembly including a flow conduit and a damper valve mounted to pivot in the conduit to decrease the flow area therein in response to increasing differential pressure of said gas upstream and downstream of the damper, yieldable means for increasingly resisting damper pivotal movement as the damper pivots away from extreme open position, and vane means lying in a plane extending generally upstream in the conduit and forming with the damper a recess located to receive the pressure of the downstream flowing gas for establishing a dynamic head condition acting to aid valve movement against said resistance, the vane means having mounting means therefor which blocks vane movement with the damper valve, the damper valve having a transverse pivot axis in the conduit, a portion of the damper valve projecting upstream with respect to said axis and at one side of the vane means, another portion of the damper valve projecting downstream with respect to said axis and containing an opening to pass the flow in damper closed configuration.

References Cited by the Examiner

UNITED STATES PATENTS

| | | | |
|---|---|---|---|
| 1,928,577 | 9/1933 | Tarone | 137—520 X |
| 2,787,288 | 4/1957 | Shataloff | 137—520 X |
| 3,111,142 | 11/1963 | Acosta | 138—46 |
| 3,143,396 | 8/1964 | Eige et al. | 137—499 X |

M. CARY NELSON, *Primary Examiner.*